(12) United States Patent
Bramberger et al.

(10) Patent No.: US 11,965,312 B2
(45) Date of Patent: Apr. 23, 2024

(54) DEVICE AND METHOD FOR CONTROLLING AND/OR CONFIGURING A CONSTRUCTION MACHINE

(71) Applicant: Liebherr-Werk Biberach GmbH, Biberach an der Riss (DE)

(72) Inventors: Robert Bramberger, Biberach an der Riss (DE); Martin Kögl, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 330 days.

(21) Appl. No.: 17/397,808

(22) Filed: Aug. 9, 2021

(65) Prior Publication Data

US 2021/0363728 A1 Nov. 25, 2021

Related U.S. Application Data

(63) Continuation of application No. PCT/EP2020/053177, filed on Feb. 7, 2020.

(30) Foreign Application Priority Data

Feb. 8, 2019 (DE) ..................... 10 2019 103 195.8

(51) Int. Cl.
*E02F 9/20* (2006.01)
*B60W 50/00* (2006.01)
(Continued)

(52) U.S. Cl.
CPC ........... *E02F 9/2054* (2013.01); *B60W 50/00* (2013.01); *B66C 13/48* (2013.01);
(Continued)

(58) Field of Classification Search
CPC .. E02F 9/2054; G06F 8/61; G06F 8/65; G06F 16/22; B60W 50/00; B60W 2556/45;
(Continued)

(56) References Cited

U.S. PATENT DOCUMENTS

| 7,921,000 B2 * | 4/2011 | Ohkura | ..................... E02F 9/26 702/182 |
| 2005/0257214 A1 * | 11/2005 | Moshir | ..................... G06F 8/65 717/171 |

(Continued)

FOREIGN PATENT DOCUMENTS

| DE | 102016004382 | 10/2017 |
| DE | 102018005550 | 1/2019 |

(Continued)

*Primary Examiner* — Yazan A Soofi
(74) *Attorney, Agent, or Firm* — Levine Bagade Han LLP (57) ABSTRACT

The invention relates to a device for controlling and/or configuring construction machines, whose electronic control device can be reconfigured and/or extended by installing a program packet, comprising a central server for providing and/or downloading different program packets, wherein the central server has access to an internal machine data database in which different machine data sets are stored, wherein the central server is designed as an open server platform with different interfaces to different external host servers, wherein a communications module activates an interface to an external machine data database and/or to an external host server according to a construction machine and/or program packet request and according to the machine data sets in the internal machine data database, and wherein the external machine data database that is separate from the central server is designed to provide a program packet of an external host server according to an authorization of the external host server.

20 Claims, 3 Drawing Sheets

(51) Int. Cl.
| | |
|---|---|
| *B66C 13/48* | (2006.01) |
| *G05B 19/042* | (2006.01) |
| *G06F 8/61* | (2018.01) |
| *G06F 8/65* | (2018.01) |
| *G06F 16/22* | (2019.01) |
| *H04L 9/40* | (2022.01) |
| *H04L 41/082* | (2022.01) |
| *H04L 67/00* | (2022.01) |
| *H04L 67/12* | (2022.01) |

(52) U.S. Cl.
CPC ............ *G05B 19/0426* (2013.01); *G06F 8/61* (2013.01); *G06F 8/65* (2013.01); *G06F 16/22* (2019.01); *H04L 41/082* (2013.01); *H04L 63/0428* (2013.01); *H04L 63/10* (2013.01); *H04L 67/12* (2013.01); *H04L 67/34* (2013.01); *B60W 2050/0083* (2013.01); *B60W 2556/45* (2020.02); *G05B 2219/2637* (2013.01)

(58) Field of Classification Search
CPC ... B66C 13/48; G05B 19/0426; H04L 41/082; H04L 63/0428; H04L 63/10; H04L 67/10; H04L 67/12; H04L 67/34

USPC .......................................................... 701/50
See application file for complete search history.

(56) References Cited

U.S. PATENT DOCUMENTS

| | | | | |
|---|---|---|---|---|
| 2008/0154691 | A1* | 6/2008 | Wellman | H04W 4/40 705/7.42 |
| 2014/0351792 | A1* | 11/2014 | Li | G06F 11/368 717/122 |
| 2017/0262263 | A1* | 9/2017 | Zinn | G06F 8/60 |
| 2019/0094834 | A1* | 3/2019 | Bramberger | G06F 30/13 |
| 2020/0319363 | A1* | 10/2020 | Bramberger | B66C 13/44 |
| 2021/0223753 | A1* | 7/2021 | Bramberger | G06Q 50/08 |
| 2022/0025611 | A1* | 1/2022 | Kandula | G05D 1/0027 |

FOREIGN PATENT DOCUMENTS

| | | |
|---|---|---|
| EP | 2963613 | 1/2016 |
| WO | WO 2002/025438 | 3/2002 |
| WO | WO 2017/174195 | 10/2017 |
| WO | WO 2020/161322 | 8/2020 |

* cited by examiner

DEVICE AND METHOD FOR CONTROLLING AND/OR CONFIGURING A CONSTRUCTION MACHINE

CROSS-REFERENCE TO RELATED APPLICATIONS

This application is a continuation of International Patent Application Number PCT/EP2020/053177 filed Feb. 7, 2020, which claims priority to German Patent Application Number DE 10 2019 103 195.8 filed Feb. 8, 2019, both of which are incorporated herein by reference in their entireties.

BACKGROUND

The present invention relates to a device and to a method for controlling and/or configuring a construction machine, whose electronic control device can be reconfigured and/or extended by installing a program packet, wherein the program packet is provided and/or downloaded from a central server having access to an internal machine data database in which different machine data sets are stored.

Construction machines used on construction sites, such as cranes, excavators, crawlers, vibrators or tillers, usually all have electronic control devices that incorporate safety programs for monitoring stability, load limit or tilt control. For example, in revolving tower cranes, the crane controller comprises a load monitoring which monitors the load taken up and the outreach thereof or the tilting moment induced by it and, if necessary, shuts down the crane once it reaches or exceeds a load limit that endangers the stability. In mobile construction machines such as excavators or crawlers, a tilt control is regularly implemented that monitors the tilt of the machine in regard to the horizontal and stops the machine or at least limits the travel speed when an tilt limit is reached or exceeded.

In this respect the construction machines and their control devices have to be updated or adapted to the respective tasks depending on the construction site and the structure to be erected, which regularly involves reconfiguring the electronic control device. If, for example, a revolving tower crane is able to cope with the normal, standard load-limiting function for the majority of the lifting tasks to be carried out on a construction site and, on the other hand, a special lifting task exceeding the maximum lifting capacity has to be carried out, it is advantageous not to install a correspondingly larger crane but to reconfigure the load monitoring function, which is implemented in the electronic control device, for this special lift by installing a program packet into the control device which, for example, permits a larger load at limited, reduced travel speeds and/or only permits operation by a very experienced crane operator who has to identify himself by means of a code.

In a similar way, the control device of construction machines is reconfigured by installing program packets when the mechanical setup state of the construction machine is changed, for example by attaching additional attachments such as excavator buckets, folding or telescopic crane boom tips, using a variable support device, changing the ballast and similar. It is also possible to adapt to different environmental impacts on the respective construction site by reconfiguring the electronic control system by installing a program packet, for example, a reduced lifting capacity and/or reduced motion speeds at installation locations with regularly high wind speeds or turbulence, or special night operating programs at construction sites with night work. An interlinked, coordinated operation of a plurality of construction machines for certain tasks on a construction site may also require a special setup of the construction machines with an adaptation or updating of the electronic control device, for example a tandem lift of two cranes in order to be able to lift a heavy or bulky component to be specially aligned, for example the rotor blade of a wind turbine.

Such program packets changing the functioning of the electronic control device, in particular its safety functions, and the changes, adaptations or modifications of the construction machine on which they are based must currently usually be requested from the manufacturer of the construction machine, calculated by him and authorized. At present, the transfer of the provided program packet usually takes place by means of physical data carriers such as CDs, DVDs or USB sticks or also by means of memory cards, with supplementary information being obviously sent via e-mails. The program packets are then installed into the electronic control device of the construction machine on site, whereas the electronic control device can usually comprise a microprocessor that processes a program from a memory device and an interface for installing a program packet.

To avoid sending physical data carriers and to be able to communicate or exchange data with construction machines more efficiently, modern cranes and other construction machines are equipped with data transmission devices that enable communication via the mobile network or data exchange via the Internet. For example, crane controllers of revolving tower cranes from Wolffkran are equipped with a VPN router or connected thereto via an interface to enable remote maintenance of the crane under the name "Wolfflink" and to transfer operating and fault data from the crane controller to a remote computer for this purpose. A similar teleservice system is known from the Liebherr company under the name "LiDAT", which transmits geographical location and operating data via GPRS to a service center and a server set up there, from where a service worker can also log into the machine's control system.

So far, however, such remote maintenance or teleservice systems have primarily only been used to transmit operating data collected on the respective machine to a service center, to evaluate it there and to be able to support the local maintenance staff on the construction site from there. The installation of safety-relevant program packets, which reconfigure a control function of the construction machine control device and change its mode of operation, is at least not part of the core area of such teleservice systems, see also Fenker, Oliver Dr.-Ing. et al. "Datenfernübertragung and Betriebsdatenerfassung-Liebherr-Teleservice für Turmdrehkrane" in Wissensportal baumaschine.de 3 (2004).

When operating a construction site, there is the additional problem that usually not all construction machines used on construction site come from the same manufacturer, therefore program packets for reconfiguring the construction machine control devices cannot be obtained from one manufacturer and its remote maintenance or service center and the server there installed. Accordingly, if different manufacturers are contacted as well as asked for appropriate program packets, it is true that appropriate program packet can be obtained for the construction machines of different manufacturers. However, this not only creates a high handling effort as such, but it is also almost impossible to coordinate the different construction machines with each other, as different manufacturers are unwilling to share core elements of the control logics with other manufacturers for reasons of secrecy.

It is therefore the underlying object of the present invention to provide an improved device and an improved method for controlling and/or reconfiguring construction machines that avoid disadvantages of the prior art and advantageously further develop the latter. In particular, the aim is to enable simplified reconfigurability, also of safety-relevant functions of control devices of construction machines, which simplifies the operation of a construction site with different construction machines of different manufacturers and takes into account the data security interests of different manufacturers.

SUMMARY

Said task is solved, according to the invention, with a device as claimed in claim 1 and a method as claimed in claim 19. Preferred embodiments of the invention are the subject-matter of the dependent claims.

Therefore, it is proposed to provide program packets for different construction machines online through a central system that can obtain and merge program packets from different separate provider servers, but is designed so that the separate provider servers do not have access to the program packets of other provider servers. According to the invention, the central server from which the different program packets are provided and/or downloaded is designed as an open server platform with different interfaces to different external host servers, wherein a communication module activates an interface to an external machine data database and/or to one of the different external host servers according to the construction machine and/or program packet request and according to the machine data stored in the internal machine data database to which the central server has access, to which the central server has access, activates an interface to an external machine data database and/or to one of the different external host servers, and wherein the external machine data database, which is separate from the central server, is designed to provide a program packet of an external provider server according to the control of the external host server.

As an open server platform, the central server enables the connection of different host servers and the transmission of program packets from different host servers to a construction site and the construction machines set up there, wherein the communication module automatically selects the correct host server suitable for the respective request on the basis of the respective construction machine and/or program packet request and the machine data sets in the internal machine data database and establishes a communication connection to it. In this respect, the external host server does not have to be concerned about its data security, since the possibly provided program packet is not provided directly to the central server of the open server platform, to which other host servers also have access, but via an external machine data database separate from the central server, to which the central server does not have an easy access. This structure of data transmission makes it possible to integrate different host servers and therefore different construction machinery manufacturers, while at the same time preventing the unintentional free accessibility of sensitive control data.

In particular, safety-relevant program packets that reconfigure, adapt and/or extend monitoring and/or safety-relevant operating functions of the control device can also be transmitted in this way to a respective construction machine that operates differently in one of its core functions after online installing of the program packet received from the external machine data database than before installing the program packet.

For example, the program packet, which was requested from the responsible host server via the open server platform and installed online via the separate, external machine data database, is used to modify a torque limiter of a lifting device used, such as a revolving tower crane, telescopic crane or other crane. Alternatively or additionally, an tilt monitoring and/or limiting system is modified on a construction machine vehicle such as an articulated truck, mobile crane, earthmover such as an excavator or crawler by means of such a program packet. Alternatively or additionally, variable support devices can be modified with regard to their control and/or geometries and/or with regard to tilting moment monitoring associated with the respective support geometry.

Alternatively or additionally, the control device of a respective construction machine can be reconfigured for different environmental impacts, for example for different wind impacts, night vision or bad weather, using the program packet installed in said manner.

Alternatively or additionally, the program packet is designed to adapt the control function of the construction machine to a respective setup state of the construction machine and/or to reconfigure it for this purpose, for example changing attachments such as excavator buckets or forks, folding and/or telescopic crane boom tips, and/or different ballast elements, winches, and/or rigging configurations.

Alternatively or additionally, the respective online program packet is intended to coordinate special operating functions of several construction machines, for example the motion control of two lifting devices for tandem lifts, and/or to adapt the motion control of a lifting device such as a crane or rope robot to the conveying and/or discharge control of a 3D printer and/or a concrete pump.

In an advantageous further development of the invention, a planning module is provided, which can be integrated into the central server of the open server platform or can be part of a server of a planning office or another external party that can be connected to it, which planning module automatically determines a program packet required at a construction machine for the respective construction site. In particular, such a planning module can be configured to match project data of the construction site at which the construction machine is to be used from a BIM server, i.e., a construction information model in which the various project data for a construction site are summarized, with the machine data sets stored in the internal machine data database, and to determine on the basis of the matching whether the control functions provided on construction machine ever used are sufficient or whether an additional, special program packet for the construction machine is required in order to be able to perform the tasks occurring on construction site. Said planning module can, for example, analyze the project data stored in the BIM with regard to structure data such as the geometry and/or weight of structure parts to be moved and/or lifted, or with regard to environmental data such as the tilt of access ramps, the wind situation on construction site or with regard to planned work sequences such as night shifts, and match them with the stored machine data sets of the respective construction machine, to determine whether the respective construction machine needs to be reconfigured and/or expanded by installing a program packet, for example for a special lift of particularly high load, a reduced wind operation threshold for critical wind situations or reduced movement speeds for particularly steep access ramps. If the planning module determines the need for a certain program packet, said program module advantageously generates said construction machine and/or program packet request automatically, based on which the communication module then activates the interface to the host server responsible for the program packet and requests the program packet there.

In an advantageous further development of the invention, the program packet provided according to the respective request via the external machine data database can be provided with a temporal and/or geographical usage restriction, in particular in the form of a usage-restricting coding, in order to restrict the usability of the installed program packet temporally and/or geographically. For example, from the respectively activated host server and/or from the central server of the server platform and/or from said planning module, according to the project data from said BIM server, a temporal expiry coding and/or a geographical usage coding, for example in the form of GPS coordinates of the construction site, can be generated and linked to the program packet.

Such a temporal and/or geographical usage restriction or a temporal and/or geographical usage permission, for example in the form of an enabling and/or usage-permitting code, does not have to be specifically linked to program packets that were provided in the described manner according to a request via the external machine data database, but can also be transmitted and/or installed in an advantageous manner for preinstalled program packets. For example, a certain program packet may be preinstalled on a construction machine used on construction site, but may be restricted in terms of time and/or geographic use, for example blocked by default by the manufacturer. If such a usage-limited pre-installed program packet is required, a usage-permitting encoding, which may have a time- and/or geographically-limiting configuration, can be transmitted according to the respective request, preferably via said external machine database. For example, the respectively activated host server and/or the central server of the server platform and/or said planning module can generate and/or transmit and/or install, depending on project data from said BIM server, a usage permission that is valid, for example, for a limited period of time and/or, for example, for a specific geographical area.

In particular, the program packet can be automatically configured, according to the respective generated request and/or according to the project data from the BIM, to query current location or geographic data and/or date data after installing it into the respective construction machine control device and to match it with the usage restriction coding in order to activate and/or shut down the program packet depending on the matching.

For example, the program packet request transmitted to a respective host server may be associated with geographic and/or temporal project data from the BIM so that the host server knows where and when the program product is to be used, whereupon the provider server and/or the central server of the server platform may implement the appropriate usage restriction.

The transmission of the program packet to the respective construction machine can basically take place in different ways. Advantageously, the program packet that has been transmitted from the respective external host server to the external machine data database or has already been stored in the external machine data database and enabled by the external host server can be transmitted from said external machine data database directly to the respective construction machine or to an associated local site server provided on construction site. Alternatively or additionally, the external machine data database can also first transmit the respective program packet to the central server, which then transmits the program packet to said local construction site server or directly to the respective construction machine, for example by actively sending or downloading it.

Furthermore, a program packet requested from an external host server can also be transmitted directly from said host server to the local construction site server or the construction machine located on construction site.

Such transmission of a program packet directly or otherwise bypassing the central server may advantageously still be subject to control by the central server and/or the BIM server and/or the project manager. For example, the transmission path can be blocked until a release for transmission is given by the central server and/or the BIM server and/or the project manager. For example, an installation interface on the construction machine and/or a construction site server communicating with the construction machine may be blocked against receiving program packets from a third party and/or request an unlock code when receiving a program packet from an external host and/or wait for an unlock code transmitted from a third party, for example the central server and/or the BIM server. Only when a suitable activation and/or transmission code is received is the installation and/or transmission of the program packet coming from another side then enabled.

In order to increase data security and prevent unauthorized access to certain program packets, said external machine data database can be delimited from the central server of the open server platform on the one hand and from the external host server requested in each case or each external host server on the other hand by differently configured encryption modules. In this context, said encryption modules can form firewalls, which can advantageously be configured differently, in particular using different encryption types and/or codes, in order to reliably prevent communication across the external machine database, for example between the central server and a respective host server.

For example, the encryption module between the external machine data database and the central server of the open server platform may be configured to query an authorization code associated with a program packet to verify that the central server knows the authorization code of the program packet stored in the external machine data database and is authorized to retrieve said program packet.

Alternatively or additionally, the encryption module between the external machine data database and the external host server may be configured to match an authorization code transmitted by the external provider server with a code provided by the external machine data database to verify that the respective host server is authorized to access the external machine data database.

Advantageously, differently configured encryption modules are provided between the external machine data database on the one hand and the multiple host servers on the other. In order to be able to communicate with the different host servers across the differently configured encryption modules, different codes for accessing different external provider servers can be kept ready in the external machine data database. Depending on which communication interface was activated by the communication module or which host server was addressed by the communication module, the corresponding code is then selected and matched with the code sent by the communicating host server.

Said communication module can be designed on a hierarchical level different from the central server and the external host servers and can be configured to control the access of the construction machines of a construction site or a local construction site server provided on construction site to the central server as well as the access of the external host servers to the external machine data database. For example, said communication module may be implemented in a cloud through which authorized construction machines or an authorized job site server can access the central server of the open server platform, and at the same time the host servers can also provide required program packets to the external machine data server or release program packets stored there.

Advantageously, a plurality of construction machines located on construction site may be connected to a local site server provided on construction site, said local site server being connected or connectable to the central server of the system. Said local construction site server may be configured in particular to receive various program packets from the central server and/or from the external machine data database on the one hand, and to provide different program packets to different construction machines on the other hand. Accordingly, the local site server provides for central data processing and/or communication interface at a subordinate level downstream of the central server before the program packets are transmitted to different construction machines.

By using such a local construction site server, the openness of the individual construction machines with regard to their connection to the data transmission system can be limited in time, for example, only be opened when a program packet is actually to be installed into a respective construction machine. By disconnecting a respective construction machine from the local construction site server in time phases in which no program packet is to be installed, the respective construction machine can remain disconnected from the system in order to completely prevent unauthorized access.

Regardless of the transmission of a respective program packet to the local job site server from the external machine data database or the central server or a separate host server, the local job site server may be controlled from the central server, in particular with respect to downloading a program packet and/or receiving a program packet. For example, from the central server, the local job site server can be instructed to download a specific program packet from a specific server, such as either the external host server or said external machine data database.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
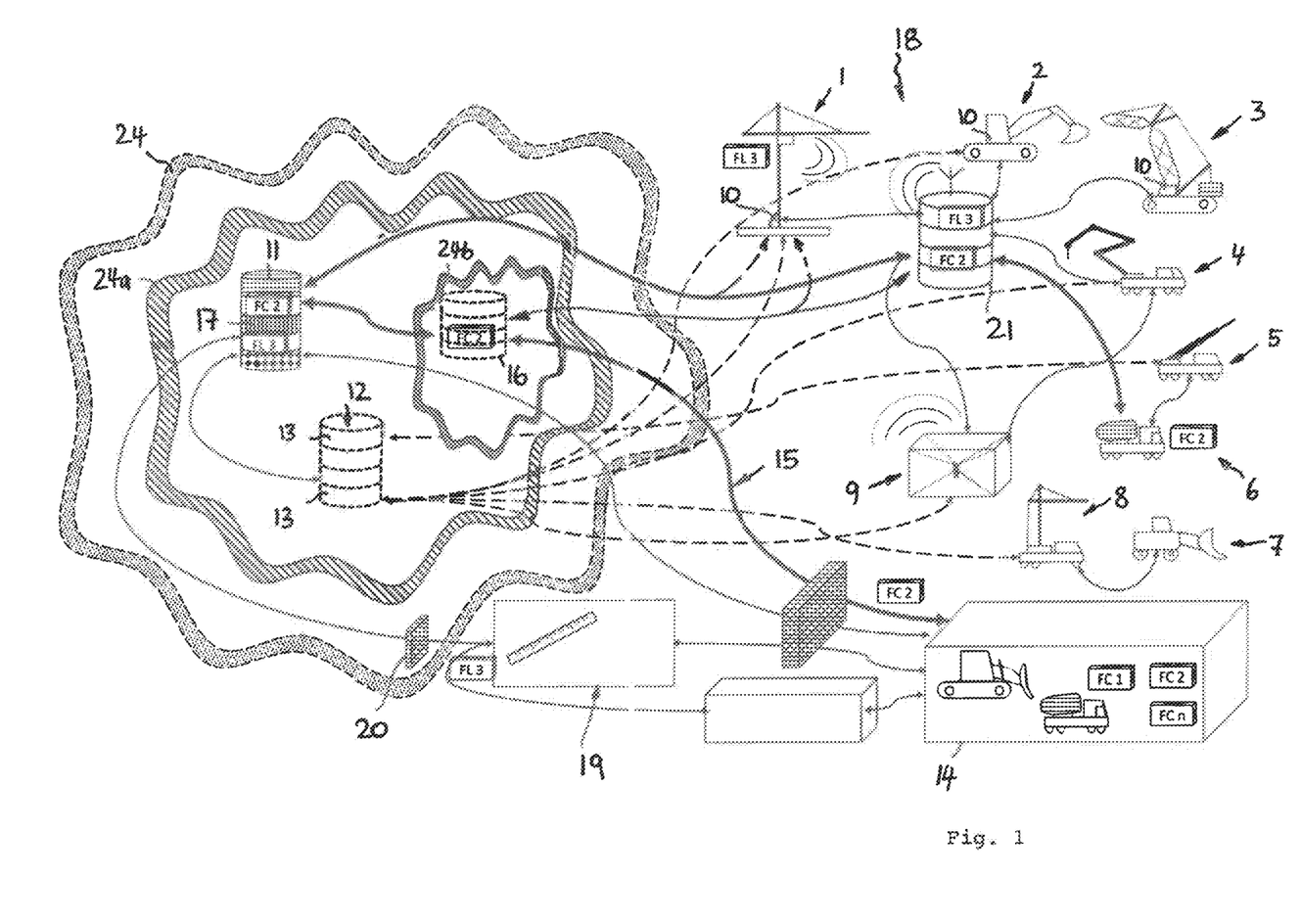
FIG. 1: a schematic representation of a device for controlling and reconfiguring construction machines used on construction site by installing a program packet into the control device of the respective construction machine, as well as the connection of the construction machines to said device according to an advantageous embodiment of the invention.

As shown in FIG. 1, different construction machines can be used on construction site 18 on which, for example, a building or another structure is being erected or a civil engineering project is being carried out, for example in the form of a crane 1, a crawler excavator 2, a cable excavator 3, a lift loader 4, a telescopic crane 5, a mixer vehicle 6, an earth mover 7, a mobile crane 8 or a cable robot 9, although other construction machines can also be used on construction site 18 in a commonly known manner.

Each of said construction machines 1 to 9 comprises an electronic control device 10, which may comprise one or more microprocessors, for example, in order to execute function programs stored in a program memory. In particular, the electronic control device 10 may comprise a motion control module for controlling different motion axes and drives, which may control automated motion paths and may also include manual controls such as joysticks and touchscreens. Furthermore, the electronic control device 10 also comprises, in particular, at least one safety-related function module, in particular a load moment limiter and/or a tilt limiter and/or other movement limiters, which can limit or switch off movements of the respective construction machine according to certain operating situations, as is commonly known.

As FIG. 1 further shows, the electronic control device 10 of each construction machine 1 to 9 comprises a communication device, for example in the form of a radio module and/or a USB interface, in order to communicate with a local site server 21 provided on construction site 18, in particular in order, on the one hand, to transmit operating data and/or machine data to the local site server 21 and, conversely, to receive communication signals from the site server 21, in particular also to have program packets FL, FC installed. The communication link between the construction machines 1 to 9 and the construction site server 21 can be permanently or temporarily limited, for example in that a respective construction machine is only communicatively connected to the construction site server 21 when a program packet is to be installed.

The installing of such program packets is controlled by a central server 11, which may be part of or implemented in a cloud 24 and may communicate with the local site server 21 via said cloud 24.

Said central server 11 has access to an internal machine data database 12 in which different machine data sets 13 for various construction machines are stored. These machine data sets 13 can contain different machine data on a respective construction machine 1 to 9, for example its manufacturer, a type identification, an equipment status or set-up status, performance data of the respective construction machine and/or data on the version of the program packets present in the memory device of the electronic control device 10.

The central server 11 thereby controls the provision of a specific program packet FL, FC to a respective construction machine 1 to 9 depending on a program packet or construction machine request, which may include the need for a required program packet. Such a program packet or construction machine request can be generated at different points, for example manually by input at the local construction site server 21 or by an external server of a project manager coordinating the construction site 18. In particular, however, said request can also be generated automatically by a planning module 17 which has access to a BIM server 19 in which project data or BIM data are stored, which can contain the structure to be built on the construction site 18 and/or work processes required for this purpose and/or materials required for this purpose and/or construction machines required for this purpose.

As shown in FIG. 1, said BIM server 19 may be separate from the central server 11 and advantageously separated therefrom by a firewall 20, said firewall 20 being advantageously controllable and/or coordinatable by the central server 11. As shown in FIG. 1, said BIM server 19 can also be separated from the provider server 14 by a firewall. Regardless thereof, the BIM server 19 may also be provided or formed outside said cloud 24, in which the central server 11 and/or the machine databases 12 and 16 may be implemented.

Alternatively to such an external design of the BIM server 19, said BIM server 19 may also be implemented in the central server 11, for example as a functional module of said central server 11. Such an internal design of the BIM server 19, i.e. provided in the central server 11 and/or the inner cloud 24*a*, can be advantageous in particular if it is a smaller construction site and/or project operator that does not provide its own BIM server and/or requires a performance-supplementing, additional BIM server.

Said planning module 17, which may be implemented in a server of the external project manager or also in the central server 11, can match machine data sets 13, which identify the construction machines 1 to 9 present on construction site 18 and may be stored, for example, in said internal machine data database 12, with said project data in the BIM server 19 in order to determine, on the basis of the matching, whether and which additional program packets FL, FC are required. The planning module 17 then generates a corresponding request, if necessary, on the basis of which the central server 11 can then control the providing of the required program packet.

As shown in FIG. 1, said BIM server 19 and/or the server of the external project manager can be separated from the central server 11 implemented in the cloud 24 by an encryption module 20 in the sense of a firewall to allow only authorized access.

Using a generated program packet or construction machine request, the central server 11 can use the machine data sets 13 to identify and contact the host server 14 to request the required program packet. As shown in FIG. 1, an encryption module 23 can also be provided between the respective external provider server 14 and the central server 11 to allow only authorized access.

According to a request received, the external host server 14 provides the respective program packet FL or FC to an external machine data database 16, which may also be implemented in a cloud 24*a* or in the same cloud 24*b* as the central server 11. If necessary, the required program packet FL or FC may also already be stored in the external machine data database 16, so that in this case only a release is transmitted from the external host server 14 to the external machine data database 16.

Figure 2:
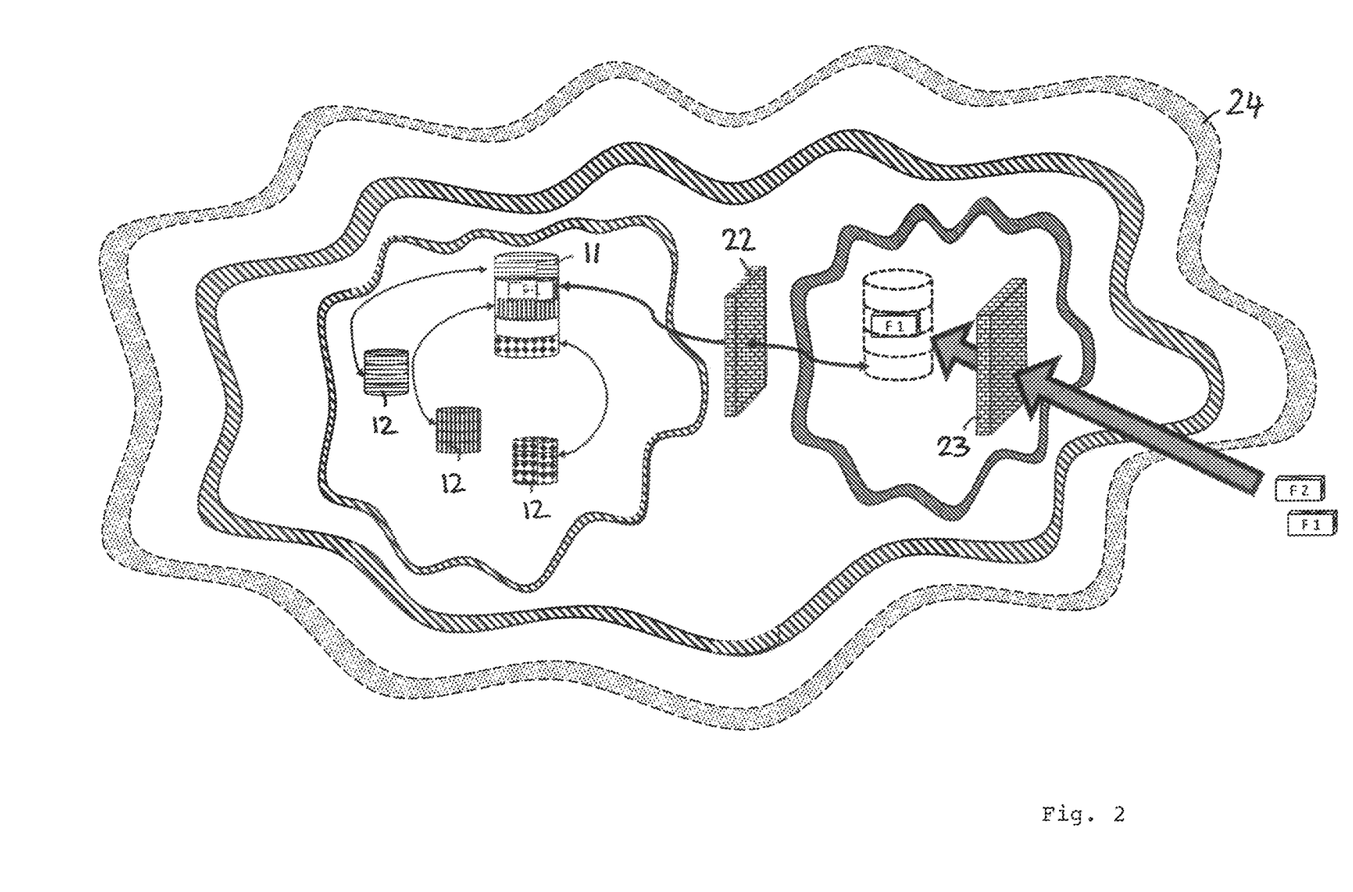
FIG. 2: a schematic representation of the central server, the internal machine data database connected thereto, and the external machine data database communicating with external provider servers, implemented as separate subsystems in a cloud.

As shown in FIGS. 1 and 2, said cloud 24 may comprise different cloud sections in the manner of onion skins, for example the inner cloud section 24*a* shown in FIG. 1, in which the central server, the internal machine database 12 and the external machine database 16 may be implemented, wherein again within said inner cloud 24*a* a further inner cloud 24*b* may be separated or formed independently, in which the external machine database part 16 is implemented. For example, said inner cloud 24*a* may be a separable part of a larger cloud, such as a commercial cloud.

Alternatively, it is also possible to work with separate, independent clouds in which separate servers and/or databases are implemented. For example, the central or inner cloud 24*a* shown may be an independently formed cloud that is not part of a larger cloud 24. Regardless thereof, the cloud 24*b* in which the external machine data database 16 is implemented may also be formed as a separate, stand-alone cloud that is independent and separate from said cloud 24*a*.

As shown in FIG. 2, said external machine data database 16 is separated from the central server 11 and also the internal machine data database 12 by an encryption module 22 to allow only authorized and possibly restricted access. On the other hand, the external machine data database 16 is also separated from the external host servers 14 by a firewall or an encryption module 23, cf. FIG. 2.

Advantageously, said encryption modules 22 and 23 may be configured differently to further secure communication across the external machine data database 16.

Figure 3:
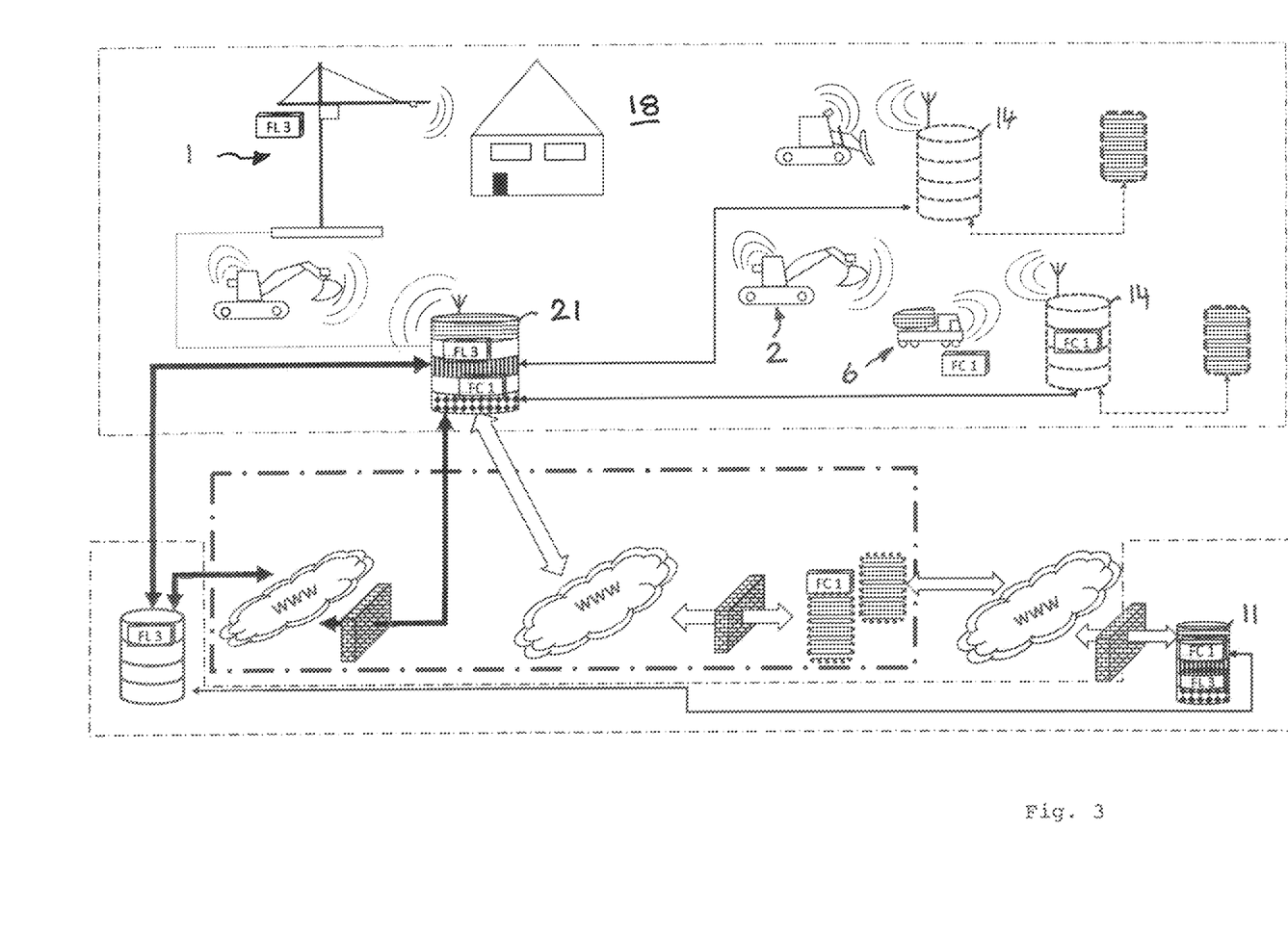
FIG. 3: a schematic representation of the device's building blocks communicating at different levels, including a local site server, the central server, and the separate host servers, as well as their connection to the construction machines on construction site.

As shown in FIGS. 1 to 3, different program packets coming from a provider server 14 can be temporarily stored in the external machine data database 16. Advantageously, several external machine data databases 16 can also be used, in each of which only program packets from a host server 14 are stored, so that each host server 14 has its own external machine data database 16, wherein these several external machine data databases can advantageously also be implemented in separate areas of a cloud or separate clouds 24.

Once a certain program packet FL or FC has been transmitted to the external machine data database 16 or temporarily stored and enabled therein, the program packet can be transmitted to the local construction site server 21 in order to be installed from there in the control device 10 of the respective construction machine.

We claim:

1. A system for controlling and/or configuring construction machines comprising:
   an electronic control device for each construction machine, wherein the electronic control device is reconfigurable and/or extendable by installing a program packet, wherein the electronic control device comprises a motion control module, wherein the motion control module comprises manual controls;
   a central server for providing and/or downloading different program packets, wherein the central server has access to an internal machine data database in which different machine data sets are stored, wherein the central server comprises an open server platform with different interfaces to different external host servers; and
   a communication module configured to activate an interface to an external machine data database and/or to an external host server according to a construction machine and/or program packet request and according to the machine data sets in the internal machine data database,
   wherein the external machine data database is separate from the central server and is configured to provide a program packet from an external host server according to an authorization of the external host server.

2. The system of claim 1, further comprising a planning module for determining the program packets required at the construction machines of a construction site, wherein the planning module is configured to match project data from a BIM server with the machine data sets stored in the internal machine data database and to determine from the matching whether an additional program packet is required for a construction machine and to generate a construction machine and/or program packet request.

3. The system of claim 2, wherein the planning module is configured to be implemented in the central server and the BIM server comprises a module external to the open server platform and separated from the central server by an encryption module.

4. The system of claim 1, wherein the program packet provided online to a construction machine is configured to reconfigure and/or extend a safety function of the electronic control device that monitors the stability and/or operational safety of the construction machine.

5. The system of claim 4, wherein the program packet is configured to reconfigure and/or extend the load moment limiter thereof and/or the motion control module thereof for controlling machine motions when installed into the electronic control device.

6. The system of claim 1, wherein the central server and/or the external host server providing or enabling the respective program packet is configured to provide the program packet with a geographical and/or temporal usage restriction coding and/or usage permission coding according to the project data from a BIM server.

7. The system of claim 6, wherein the geographical and/or temporal usage restriction coding is configured to retrieve current geographical position data and/or current date data from the electronic control device of a respective construction machine after installing into the electronic control device and to match it with the usage restriction coding and according to the matching to completely or partially enable or completely or partially disable and/or restrict the program packet.

8. The system of claim 1, wherein the external machine data database is configured to selectively provide the program packet to the central server for transmission to a construction machine or only directly to the construction machine or a local job site server connectable thereto, bypassing the central server, according to an authorization received from the external host server.

9. The system of claim 1, wherein the external machine data database is delimited from the central server and from the external host server by differently configured encryption modules.

10. The system of claim 9, wherein the encryption module is configured between the external machine data database and the central server to retrieve an authorization code associated with a program packet.

11. The system of claim 10, wherein the encryption module between the external machine data database and the external host server is configured to match an authorization code transmitted from the external host server with a code provided by the external machine data database and according to the matching to enable or disable communication between the external machine data database and the external host server.

12. The system of claim 1, further comprising differently configured encryption modules with the external machine data database and different external host servers, wherein different codes for unlocking the access of different external host servers are in a ready state in the external machine data database.

13. The system of claim 1, wherein the communication module has a hierarchical level design different from the central server and the external host servers and can be configured to control the access of the construction machines or a local construction site server connectable thereto to the central server and access of the external host servers to the external machine data database.

14. The system of claim 13, wherein the communication module is implemented in a cloud.

15. The system of claim 14, further comprising a local job site server connected and/or connectable to the central server and configured to provide different program packets to different construction machines and to receive different program packets from the external machine data database.

16. The system of claim 15, wherein the local construction machine server is adapted to receive program packets from the central server.

17. The system of claim 1, wherein the central server is configured to control the transmission of a program packet to the local site server.

18. The system of claim 1, wherein the program packet transmitted from the external host server and/or temporarily stored in the external machine data database is with a construction machine coding, and wherein the central server and/or the external machine data database provides the program packet to a certain construction machine and/or to a certain local site server for transmission to a certain construction machine.

19. A method for controlling and/or configuring a construction machine, comprising:
reconfiguring and/or reinstalling a program packet for an electronic control device for each construction machine, wherein the electronic control device comprises a motion control module, wherein the motion control module comprises manual controls,
providing and/or downloading different program packets by a central server according to a construction machine and/or program packet request and according to machine data sets, which are stored in an internal machine data database and are made available to the central server, wherein the providing and/or downloading of a certain program packet is controlled,
connecting different external provider servers to the central server via different interfaces,
setting up a communication connection to an external machine data database and/or to an external host server by a communication module according to the respective construction machine and/or program packet request and according to the machine data sets in the internal machine data database via one of said interfaces, and
wherein a program packet, which is transmitted to the separate machine data database by the external host server or stored in the separate machine data database and enabled by the external host server, is made available via the separate machine data database for transmission to a construction machine according to an authorization of the external host server.

20. The method of claim 19, reconfiguring a safety-monitoring function of the control device by installing the program packet transmitted online into the electronic control device, wherein the safety-monitoring function comprises a load moment limiter and/or load limiter and/or tilt limiter implemented in the control device.

* * * * *